SPINNING APPARATUS UTILIZING AIRSTREAM

Original Filed March 27, 1967 3 Sheets-Sheet 1

INVENTOR
KIYOSIGE ISOMURA

BY Wenderoth, Lind & Ponack

ATTORNEYS

SPINNING APPARATUS UTILIZING AIRSTREAM

Original Filed March 27, 1967 3 Sheets-Sheet 2

INVENTOR
KIYOSIGE ISOMURA

BY Wenderoth, Lind and Ponack

ATTORNEYS

KIYOSIGE ISOMURA

INVENTOR

BY Wenderoth, Lind and Ponack

ATTORNEY

United States Patent Office

Re. 27,499
Reissued Oct. 3, 1972

27,499

SPINNING APPARATUS UTILIZING AIRSTREAM

Kiyosige Isomura, Kariya, Japan, assignor to Toyoda Automatic Loom Works, Ltd., Kariya, Aichi Prefecture, Japan Original No. 3,411,283, dated Nov. 19, 1968, Ser. No. 626,224, Mar. 27, 1967. Application for reissue Nov. 19, 1970, Ser. No. 91,168
Claims priority, application Japan, Mar. 31, 1966, 41/20,325, 41/20,326
Int. Cl. D01h *1/12*
U.S. Cl. 57—58.89 8 Claims

Matter enclosed in heavy brackets [ ] appears in the original patent but forms no part of this reissue specification; matter printed in italics indicates the additions made by reissue.

ABSTRACT OF THE DISCLOSURE

Apparatus for continuous spinning utilizing an airstream issuing into a spinning chamber. Said spinning chamber having oppositely formed inclined walls which form a V and said apparatus having a guide tube for depositing opened sliver-like fiber in said V-shaped area. The spinning chamber having vanes at the top thereof to facilitate discharge of air toward a suction box connected to a source of negative pressure.

In the art of recently developed spinning machinery, efforts have been directed toward obtaining high production by increasing the speed of the operation of the machinery. However, with respect to the conventional spinning frame provided with a plurality of pairs of draft rollers for obtaining parallelism and draft of the fibers and provided with a ring, traveller and a bobbin rotating in the center of said ring, the speed of operation thereof is limited to some extent. Higher speed running, especially of the traveller, is very difficult and would result in defective yarn quality and frequent yarn breakage. Hence, the principal object of the present invention is to overcome the above mentioned disadvantages by providing a new method and apparatus for spinning by utilizing an airstream for obtaining opening and parallelism of fibers and twisting of the yarn.

Heretofore, there has been proposed a continuous spinning method and apparatus utilizing an airstream, wherein there is provided a spinning rotor having a plurality of orifices opening outwardly for discharging air for the purpose of separating the fibers and air. In such method, however, the orifices are liable to be filled with short fiber, such as seed cotton, leaf cotton, etc., resulting in deterioration of the yarn quality, and frequent stoppage of the spinning operation.

It is an object of the present invention to provide a new apparatus for spinning which is simple in construction and more reliable in operation as compared with the heretofore proposed method and apparatus utilizing an airstream.

It is a further object of the invention to provide a new apparatus for spinning by means of an airstream, in which a spinning rotor rotating at high speed is employed having therein a spinning chamber, in which chamber the yarn fibers perform a spiral motion along to the inner wall of the spinning chamber by the action of centrifugal force, and the fibers are readily separated from the airstream being discharged from the spinning chamber.

These and other objects of the present invention will become apparent from the following detailed description taken in conjunction with the accompanying drawings wherein.

Figure 1:
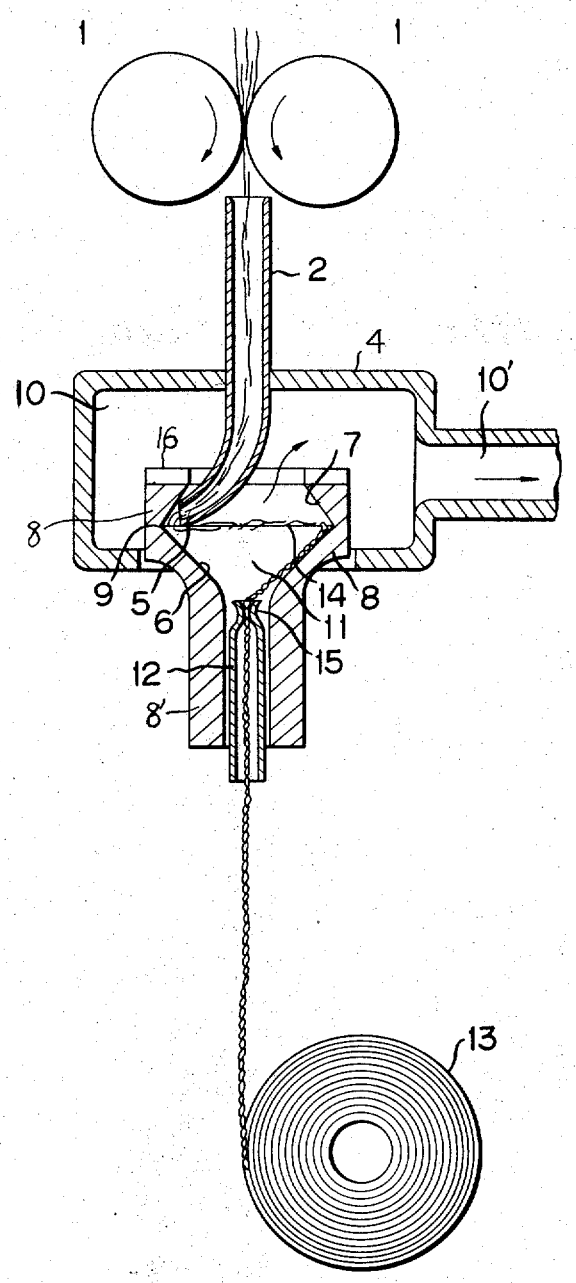
FIG. 1 is a sectional view of the spinning apparatus forming one embodiment of the present invention.
Figure 5:
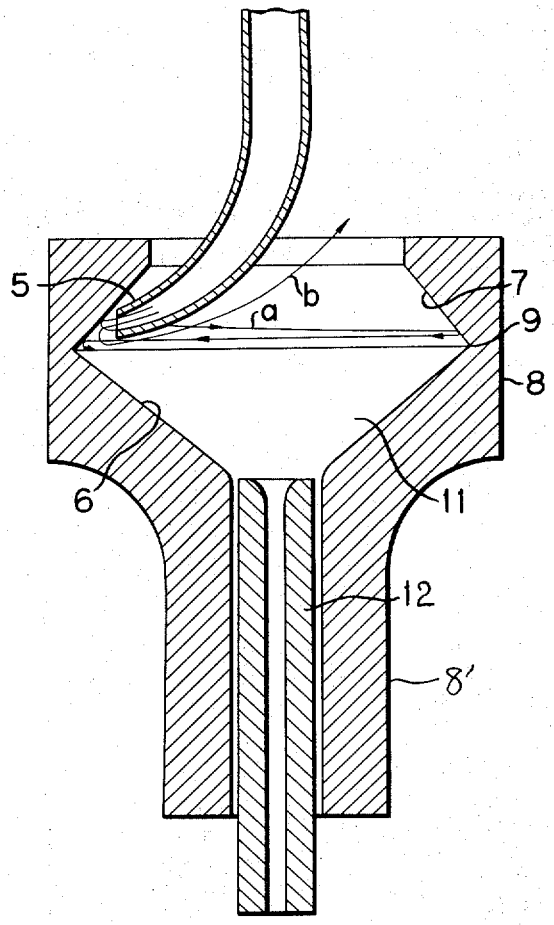
FIG. 5 is a somewhat enlarged sectional view of the spinning rotor shown in FIG. 1, showing the path of motion of the airstream and the yarn fibers in the spinning chamber of the spinning rotor.

Referring to FIG. 1, the sliver-like fiber fed from a pair of feed rollers 1 is introduced into and conveyed through a small guide tube 2, in which the sliver-like fiber is conveyed and opened while maintaining its parallelism by being entrained by a high speed airstream under negative pressure. This guide tube 2 is securely mounted on an immovable support member or casing 4. The lower end of the guide tube 2 is formed into a nozzle 5, from which the airstream together with the fiber is ejected. There is provided a spinning rotor 8 having a spinning chamber formed in the upper portion thereof. Said spinning chamber consists of a lower funnel-like conical space having a conical inner wall 6 and an upper conical space having a conical inner wall 7, said lower and upper conical spaces joining each other at the bases of the cones as shown, forming a V-shaped inner circumferential portion 9 at crossing of the generation lines of the lower and upper cones. The nozzle 5 of the guide tube 2 is directed toward the inner wall of the spinning chamber and disposed in the vicinity of said V-shaped portion 9, i.e., the maximum diameter portion, so that the yarn fiber coming from the nozzle 5 will reach the V-shaped portion in a minimum length of time and distance. Consequently, it is possible to prevent any floating of the yarn fiber. Preferably, as shown in FIG. 5, the nozzle 5 may be bent outwardly and so arranged that the fiber entrained by the airstream and ejected therefrom will be directed against the inner conical wall 7 in the vicinity of the V-shaped portion 9. By such arrangement, it is possible to prevent disturbance of the yarn fiber.

The upper portion of the spinning rotor 8 is enclosed in the casing 4 forming a suction box 10 which is connected at one end to any source of negative pressure through a pipe 10'. As the nozzle 5 of the guide tube 2 is in communication with the suction box 10, a high speed airstream will be generated through the guide tube 2 by the negative pressure of air.

The depending tubular stem 8' of the spinning rotor 8 is a continuation of the lower conical space 11 having inner conical wall 6, and is provided with a spinneret tube 12.

The sliver-like fiber fed from the feed rollers 1 is introduced into the guide tube 2 and is conveyed through the same by the action of the high speed airstream, whereby the fiber is opened while maintaining the parallelism thereof. The speed of the airstream may be regulated by adjusting the negative pressure in the suction box 10. The fiber coming from the nozzle 5 of the guide tube 2, as entrained by the airstream, will contact and proceed along the upper conical wall 7 of the spinning chamber of the spinning rotor 8 by the action of centrifugal force. As the nozzle 5 opens in the vicinity of the wall 7, the succeeding yarn fiber coming from the nozzle will impinge against the preceding yarn fiber 14 which is in contact with the conical wall 7. Thus the yarn fiber will be deflected in the circumferential direction, contacting the wall 7, and will be put in parallel with the preceding yarn fiber 14. As the fiber contacting the upper conical wall 7 subjected to centrifugal force, said fiber will be moved ›ward the V-shaped portion 9 of the spinning chamber, › that the path of the motion of the fiber can be shown y the spiral line a in FIG. 5. As the motion of the fiber being guided by the conical wall 7, said motion will not e disturbed at all. Since the nozzle 5 is disposed in the icinity of the upper conical wall 7, there is no tendency f the fiber to move into a floating position in the spinning chamber, but the same will instantly contact to the pper conical wall 7, while maintaining the parallelism ıereof. On the other hand, the speed of the airstream oming from the nozzle 5 of the guide tube 2 will be uickly reduced due to the fact that the volume of the pinning chamber is much larger than the cross-sectional rea of the guide tube 2, and that it is not aimed directly gainst the V-shaped portion 9. So, the airstream in the pinning chamber will not disturb the yarn fiber in the pinning chamber. The airstream will take the path shown y line b in FIG. 5 and, through the passage 3 and the uction box 10, will be discharged to the atmosphere.

The leading end of the twisted yarn as formed from the arn fiber 14 will be subjected to tension due to the extemely high centrifugal force upon the yarn fiber 14 by igh speed rotation of the spinning rotor 8, so that the wisted yarn will be given enough tension to be conveyed ›ward the spinneret tube 12.

Figure 4:
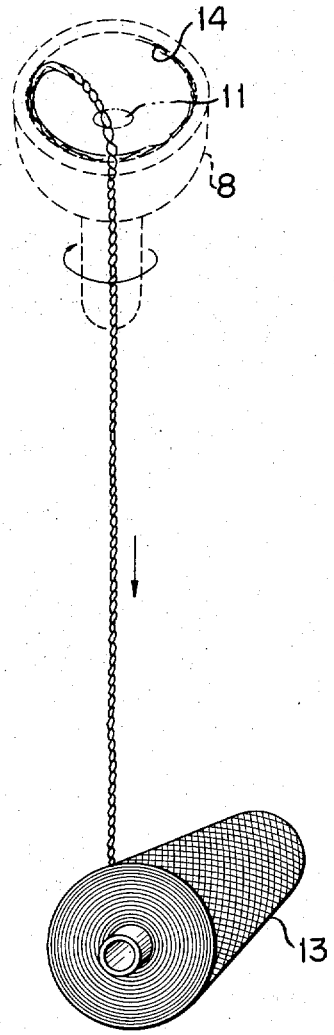
FIG. 4 is a schematic perspective view of the spinning apparatus and a package upon which the spun yarn is wound.

As shown in FIG. 4, the yarn fiber 14 will be rotated ı the direction of the arrow by the high speed rotation f the spinning rotor 8, so that the yarn fiber 14 and the wist yarn will be subjected to twisting action between he V-shaped portion 9 and the package 13. At this stage, : will be seen that the twist yarn proceeding into the nonotatable spinneret tube 12 will be pressed against the ›wer conical wall 6 by the action of centrifugal force, o that the leading portion of the twist yarn will be further ubjected to twisting action. In the above mentioned manner, the twist yarn will successively pull the yarn fiber oming from the nozzle 5 in the vicinity of the V-shaped ›ortion 9, and the yarn passing through the non-rotatable pinneret tube 12 will be wound upon the package 13.

As shown in FIG. 1, an immovable spinneret tube 12 or resistance tube) is positioned in the rotating tubular tem 8'. This tube 12 has at its upper end a necked-in assage 15. The provision of the non-rotatable tube 12 is ›r the purpose of slightly gripping the yarn at the upper oint of the spinneret tube so as to limit the twisting action › the free portion of the yarn fiber. By means of such neasure, the twisting of the yarn fiber 14 will occur mainy between the V-shaped portion 9 and the upper end of he non-rotatable tube 12, i.e. for the limited length of he yarn fiber 14, increasing unity among fibers and thereıy facilitating continued winding operations.

Figure 2:
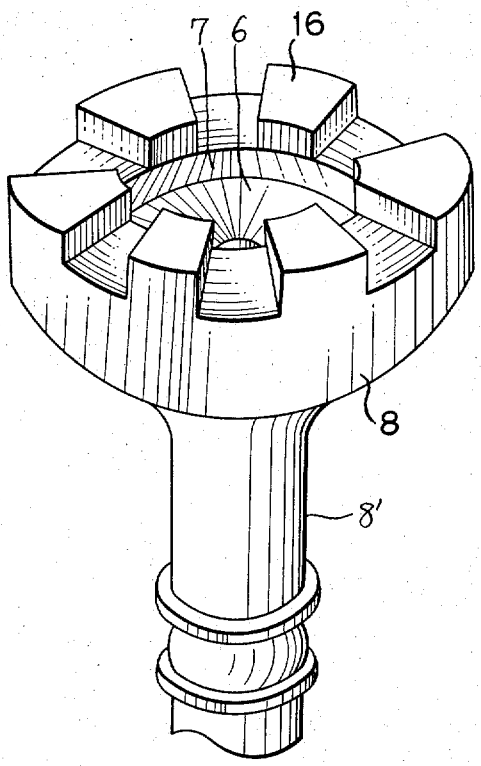
FIG. 2 is a perspective view of a modified form of the spinning rotor employed in the apparatus.

As shown in FIG. 2, the top portion is provided with a ılurality of projections or vanes 16 and depression alterıately arranged. The provision of these vanes 16 will aid he discharge of air from the spinning chamber of the spinıing rotor according to the high speed rotation of the spinıing rotor. Consequently, negative pressure required for nducing the operative airstream can be considerably educed.

Figure 3:
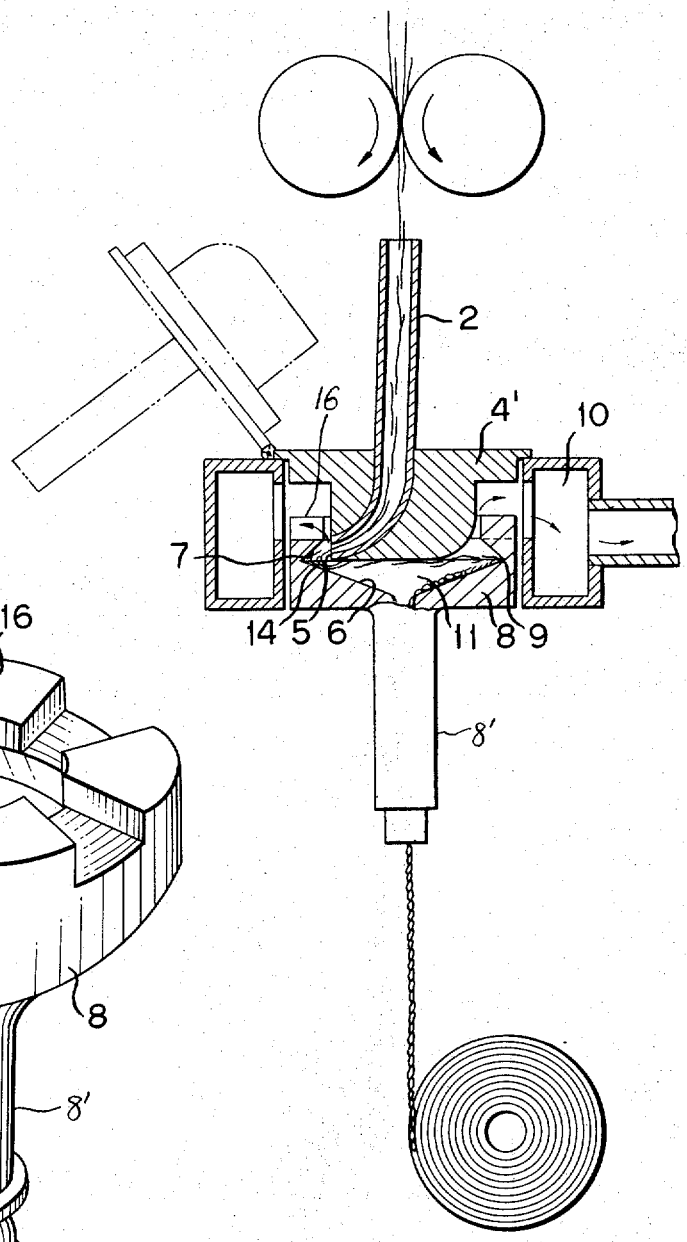
FIG. 3 is a sectional view of another modified form of the spinning apparatus according to the invention.

In the modified form of the apparatus shown in FIG. 3, he support member 4' is detachably mounted upon the uction box 10, while the casing 4 in FIG. 1 is securely nounted. This detachable mounting of the support memıer 4' is preferred in order to facilitate inspection and leaning of the interior of the spinning rotor 8. The airtream will readily pass through the clearance between the upport member 4' and the inner edge of the top of the pinning rotor in the direction of the arrow.

What I claim is:

1. A spinning apparatus comprising a guide tube having ıt one end a nozzle and adapted to guide and convey a liver-like fiber toward said nozzle by means of an airtream, a high speed rotatable spinning rotor provided vith a spinning chamber having a mouth at the top thereof for discharging air and having a centrally arranged depending tubular stem, a non-rotatable spinneret tube positioned in said stem, said spinning chamber having a lower funnel-like conical space and an upper conical space above said lower funnel-like conical space with the bases of said spaces joining each other to form a V-shaped portion at the crossing of the generation lines for the conical inner walls of said chamber, said guide tube having a nozzle on the lower end thereof opening into said spinning chamber adjacent said V-shaped portion, a plurality of vanes at the edge of said top mouth of the spinning chamber, and a source of negative pressure connected to the space between said vanes, whereby the yarn fiber in said spinning chamber is subjected to centrifugal force and contacts the inner wall of the rotating spinning chamber while being subjected to spiral motion and is twisted thereby.

2. A spinning apparatus as recited in claim 1, wherein the nozzle of said guide tube is slightly bent outwardly and is directed toward the upper conical inner wall of the spinning chamber in the vicinity of said V-shaped portion of the inner wall.

3. A spinning apparatus as recited in claim 1, wherein the non-rotatable spinneret tube in said depending tubular stem has a neck at the upper end thereof.

4. A spinning apparatus as recited, in claim 1 further comprising a support member to which said guide tube is fixed, and a suction box around said spinning rotor and on which said support member is detachably mounted.

*5. A spinning apparatus for spinning a fiber sliver having a rotatable chamber with a maximum diameter portion, said chamber having an open end and inner wall diverging from said open end to said maximum diameter portion, means coupled to said chamber for rotating said chamber, means coupled to said chamber for creating a negative pressure in said chamber, means for opening said fiber sliver into discrete fibers, a fixed guide tube means extending from said opening means into said chamber through said open end for guiding and conveying discrete fibers into said chamber by means of an air stream produced by the negative pressure in said chamber, said guide tube means having an opening at the end within said chamber directed against said inner wall for laying down fibers on said inner wall as said chamber rotates to move said inner wall past the end of the guide tube along a path opposite the mouth of the guide tube, whereby the fibers in the path move spirally along the inner wall to the maximum diameter portion, said chamber having a withdrawal orifice opening through said chamber wall, and means coupled to said orifice for withdrawing yarn through said orifice out of said chamber.*

*6. A spinning apparatus comprising a rotatable spinning chamber having conical inner walls, the bases of which join each other to define a V-shaped maximum diameter portion, a fixed guide tube having a nozzle at one end thereof, said nozzle being directed against and positioned in the vicinity of one of said conical inner walls of said chamber, means operatively associated with said apparatus for producing an airstream through said guide tube for guiding and conveying discrete fibers toward said conical inner wall and to cause said guide tube to lay down fibers on said inner wall as said chamber rotates to move said inner wall past the end of the guide tube along a path opposite the mouth of the guide tube, whereby the fibers in the path move spirally along the inner wall to the maximum diameter portion, a spinneret tube opening into said chamber, and means coupled to said spinneret tube for conveying a yarn produced in said chamber through said spinneret tube.*

*7. A method of spinning utilizing negative pressure existing in a rotating spinning chamber, said chamber having an inner wall widening from an open end in said chamber to a maximum diameter portion, said method comprising the steps of opening a fiber sliver into discrete fibers; entraining said fibers in a confined airstream produced by the negative pressure in said chamber while*

*maintaining the parallelism of the fibers; rotating said spinning chamber at a speed such that the peripheral speed of said inner wall is greater than the speed of said fibers in said airstream; directing said airstream with said entrained fibers into said chamber and then transversely of the axis of rotation of the chamber onto inner wall of said chamber and laying down the fibers on a path on said inner wall moving past the end of said airstream; subjecting said fibers to centrifugal force for effecting adherence of the fibers along the path to said inner wall and for accelerating said fibers and causing them to slide along a spiral line on said wall toward said maximum diameter portion; collecting said fibers in said maximum diameter portion of said chamber; twisting said fibers into the tail end of a yarn; and withdrawing the spun yarn from said chamber.*

*8. A method of spinning a yarn to be wound on a package by means of a rotatable spinning chamber having a V-shaped portion between conical inner walls, comprising the steps of opening a sliver-like fiber, entraining said opened fibers in a confined airstream, directing the airstream with the fibers into the chamber and then laterally of the axis of rotation of the chamber, ejecting the fibers against one of said conical inner walls, and laying down the fibers on a path on said inner wall as said chamber rotates to move said inner wall past the end of said airstream, subjecting said fibers to centrifugal*

*force for separating the fibers from the airstream and discharging the air from the spinning chamber and for moving the path fibers on a spiral line on said conical inner wall toward said V-shaped portion to form a fiber yarn, twisting said fiber yarn into a yarn by subjecting said yarn to a twisting action by rotation of said spinning chamber, and pulling said yarn from said chamber and winding it upon said package.*

References Cited

The following references, cited by the Examiner, are of record in the patented file of this patent or the original patent.

UNITED STATES PATENTS

| | | | |
|---|---|---|---|
| 3,163,976 | 1/1965 | Julliard | 57—58.89 |
| 3,328,949 | 7/1967 | Pavek et al. | 57—58.89 |
| 2,808,697 | 10/1957 | Williams | 57—58.95 |
| 3,339,359 | 9/1967 | Ripka et al. | 57—58.89 |
| 3,121,306 | 2/1964 | Cizek et al. | 57—58.89 |
| 3,126,697 | 3/1964 | Cizek et al. | 57—58.89 |
| 3,339,360 | 9/1967 | Mikulecky et al. | 57—58.89 |

DONALD E. WATKINS, Primary Examiner

U.S. Cl. X.R.

57—139